United States Patent [19]
Tsai

[11] Patent Number: 5,191,391
[45] Date of Patent: Mar. 2, 1993

[54] HIGH RESOLUTION PLANE MIRROR INTERFEROMETER

[75] Inventor: John C. Tsai, Saratoga, Calif.

[73] Assignee: Excel Precision, Santa Clara, Calif.

[21] Appl. No.: 647,716

[22] Filed: Jan. 29, 1991

[51] Int. Cl.$^5$ .............................................. G01B 9/02
[52] U.S. Cl. .................................. 356/351; 356/358; 356/349
[58] Field of Search ............... 356/351, 356, 345, 349, 356/358, 363

[56] References Cited

U.S. PATENT DOCUMENTS

| | | | |
|---|---|---|---|
| 3,674,371 | 7/1972 | Dukes | 356/106 |
| 3,790,284 | 2/1974 | Baldwin | 356/106 |
| 3,976,379 | 8/1976 | Morokuma | 356/351 |
| 4,334,778 | 6/1982 | Pardue et al. | 356/349 |
| 4,711,574 | 12/1987 | Baldwin | 356/349 |
| 4,859,066 | 8/1989 | Sommargren | 356/351 |
| 4,881,815 | 11/1989 | Sommargren | 356/349 |

OTHER PUBLICATIONS

Schellekens, et al., Measurements of the Refractive Index of Air Using Interface Refractometers, Metrologia, Spring, 1986.
Siddal and Baldwin, Some recent developments in Laser Interferometery, undated.

*Primary Examiner*—Samuel A. Turner
*Attorney, Agent, or Firm*—Michael J. Hughes

[57] ABSTRACT

What is disclosed is an improved high resolution laser interferometer (10) which gains an increase in available resolution by means of increasing the number of reflections of a measurement laser beam (16) from a plane mirror (20) and thus by increasing the number of Doppler shifts undergone by the measurement laser beam (16). The inventive arrangement of optics combines a polarizing cube (24), a cube corner retroreflector (28), a right angle reflector (30), and one or more quarter wave plates (32) and (34) to produce the desired result. In the practice of the present invention, the measurement laser beam (16) is directed from a laser head (12) such that it is affected four times by any movement of the objective plane mirror (20) in a measurement plane (22) before being compared to a reference laser beam (16) in a signal analysis unit (14). The reference laser beam (16) is routed in a conventional manner to the signal analysis unit (14).

11 Claims, 1 Drawing Sheet

HIGH RESOLUTION PLANE MIRROR INTERFEROMETER

TECHNICAL FIELD

The present invention relates generally to the use of lasers to detect and measure movement, and more particularly to an improvement which increases the resolution of a laser interferometer. The predominant current usage of the improved laser interferometer of the present invention is in the precise measurement of relative movement, and thus of relative displacement, in scientific research and in applications requiring extreme measurement precision such as the manufacture of integrated circuits.

BACKGROUND ART

The interferometer is a device which can be used for optically determining a distance moved and/or a speed of movement and thus, indirectly, a relative distance. Laser interferometers are used for the accurate determination of length and the calibration of precision length measuring equipment. Although such devices have been known and used in the field for some time, the degree of precision attainable has increased considerably in recent years. Numerous innovations have each contributed to additional increases in resolution and reliability of such devices, and have expanded the scope of useful applications. However, the need to accurately measure smaller and smaller distances in both the field of metrology and in the manufacturing sector has increased at least as rapidly as any advances in the ability to conveniently measure those distances.

Many of the advances in the field have involved improvements in the electronic apparatus for detecting and analyzing fringes created by phase differences between a measurement laser beam and a reference laser beam, and thus for detecting and analyzing indications of movements resulting in changes in length of a path traveled by the measurement laser beam. However, some of these improvements have also involved the optical aspects of the laser interferometer.

Two of the most common types of interferometer optic arrangements known in the field are the linear interferometer and the plane mirror interferometer. The linear interferometer compares a measurement laser beam, which has been directed to a movable target and reflected to a detector, to a reference laser beam which has traveled a fixed distance. Doppler shift of the measurement laser beam caused by any movement of the target results in detectable phase distinctions between the measurement laser beam and the reference laser beam. The typical resolution attainable by a linear interferometer is one quarter of a wave length of the measurement laser beam.

The plane mirror interferometer has provided a significant variation of the laser interferometer. Briefly, the plane mirror interferometer provides for an increase in resolution by directing the measurement laser beam such that it travels the distance between the interferometer optics and the moving target four times, twice upon being directed toward the target and twice upon being reflected from the target back toward the interferometer optics, thus providing for two Doppler shifts of the measurement laser beam. This increases any phase difference between the measurement laser beam and the reference laser beam for any given movement of the target, and thus provides for detection of target movement at an improved level of resolution. The typical resolution attainable by a plane mirror interferometer is one eighth of a wave length of the measurement laser beam. A good description of the common plane mirror interferometer is to be found in U.S. Pat. No. 4,334,778, issued to Pardue et al., which patent teaches a variation of the plane mirror interferometer adapted to the specific purpose of measuring a distance between two opposed surfaces.

Although the several improvements in the field have resulted in a considerably increased potential resolution, there remains a need for yet further improvement. While the idea of increasing resolution by means of an increased number of passes of the measurement laser beam between the interferometer optics and a target has been the subject of some investigation, methods for accomplishing this goal which have been tried have been less than ideally successful, due primarily to the fact that the increased quantity of optical components involved has introduced unwanted complexity and an increased error factor. Also, in all such attempts with which the inventor is familiar, at least some of the added optical components have not been incorporated as a single unit into the primary optical unit. Of course, this has resulted in an increased potential for misalignment and in resultant reduced resolution and/or reduced reliability. Clearly, there exists a need for a means to increase the obtainable resolution of a laser interferometer by increasing the passes of the measurement beam which is reliable and accurate in operation and which does not introduce unwanted complexity or error.

All of the prior art interferometers within the inventor's knowledge have incorporated optics which were either incapable of the resolution attainable through use of the present invention or were prone to misalignment or other error producing aberrations.

No prior art interferometer to the inventor's knowledge has successfully provided resolution on the order of one sixteenth of a wave length without itself being a source of considerable potential error. All successful laser interferometer optics to date have provided fewer than four Doppler shifts of the measurement beam, or else have not taken full advantage of any additional Doppler shifts because of a less than ideal optical arrangement.

DISCLOSURE OF INVENTION

Accordingly, it is an object of the present invention to provide an interferometer capable of extremely fine resolution.

It is another object of the present invention to provide a means for increasing the resolution of interferometers which is not expensive to manufacture.

It is still another object of the present invention to provide a means for increasing the resolution of interferometers which is reliable in operation.

It is yet another object of the present invention to provide a means for measuring distances with greater accuracy using conventional interferometer laser emitting devices and electronic analyzing devices.

It is a further object of the present invention to provide a means for increasing the number of passes of the measurement beam in a plane mirror interferometer without introducing increased complexity and resultant potential error to the system.

Briefly, the preferred embodiment of the present invention is a plane mirror interferometer employing a unique arrangement of a polarizing cube, a cube corner retroreflector, a right angle reflector, and two quarter wave plates to direct a measurement laser beam such that the measurement laser beam must traverse the distance between the interferometer optics and a plane mirror objective eight times before the measurement laser beam is returned to an analyzer section for comparison to a reference laser beam. This arrangement causes the measurement laser beam to be Doppler shifted four times, as a result of any movement of the plane mirror in the relevant plane, prior to its being compared to the reference laser beam, which provides for physical resolution of one sixteenth of a wavelength.

The increased resolution made attainable through use of the inventive high resolution laser interferometer results in a compromise in measurement rate, or slew speed, which is acceptable in most applications, particularly considering the importance of the increased resolution.

An advantage of the present invention is that physical resolution can be attained to one sixteenth of a wavelength.

A further advantage of the present invention is that distances may be determined to a great degree of accuracy.

Yet another advantage of the present invention is that it may be used with conventional laser emitting and analyzing devices.

Still another advantage of the present invention is that it is easy and inexpensive to manufacture in comparison to prior art means for increasing the resolution of laser interferometers.

Yet another advantage of the present invention is that the optical components may be joined into a unitary piece such that components are unlikely to move relative to each other.

Still another advantage of the present invention is that potential optical path errors are minimized.

These and other objects and advantages of the present invention will become clear to those skilled in the art in view of the description of the best presently known mode of carrying out the invention and the industrial applicability of the preferred embodiments as described herein and as illustrated in the drawing.

BEST MODE FOR CARRYING OUT INVENTION

Figure 1:
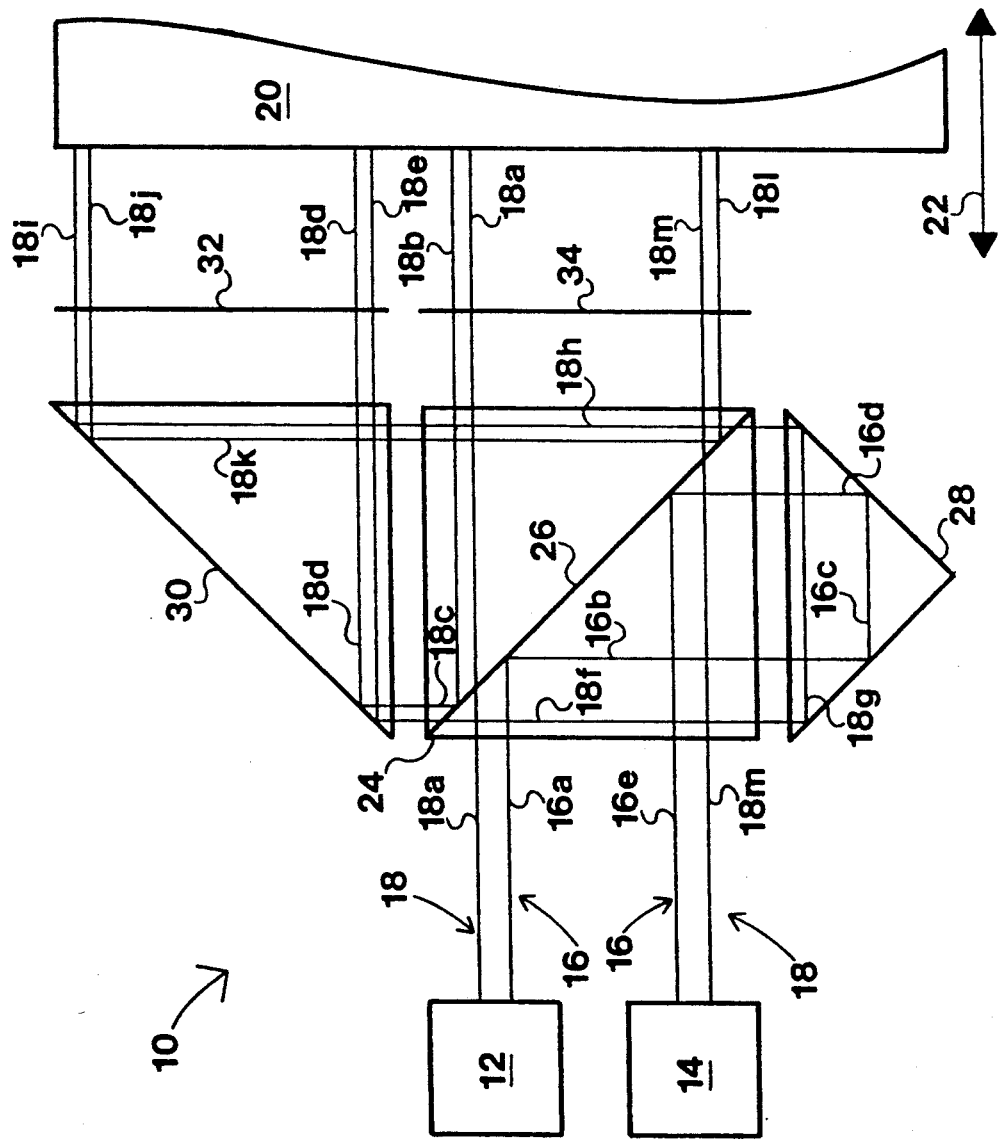
FIG. 1 is a two dimensional diagram of a high resolution plane mirror laser interferometer, according to the present invention.

The best presently known mode for carrying out the invention is a laser interferometer having a unique combination of optical components for causing a measurement laser beam to traverse a distance between the interferometer optics and a movable target eight times, such that the measurement laser beam will be Doppler shifted four times before being compared to a reference laser beam. The predominant expected usage of the inventive improved laser interferometer is in the microchip manufacturing industry, particularly in the control of wafer stepper apparatus wherein extremely high positioning accuracy is desirable.

The high resolution laser interferometer of the presently preferred embodiment of the present invention is illustrated in a side view two dimensional diagram in FIG. 1 and is designated therein by the general reference character 10. It should be noted that two dimensional diagrams such as FIG. 1 are commonly used in the field to depict optical paths. One skilled in the art will recognize that, although displacement between paths must be shown in such diagrams in the two available dimensions, such displacement may in fact occur in the third physical dimension in the actual embodiment of the device.

In many of its substantial components, the high resolution interferometer 10 does not differ significantly from conventional laser interferometers. The physical structure is similar to that of prior art plane mirror laser interferometers. The conventional elements of the high resolution interferometer 10 include a laser head 12 and a signal analysis unit 14. In the best presently known embodiment 10 of the invention, the laser head 12 is a frequency stabilized Helium-Neon Zeeman type laser which produces a reference laser beam 16 and a measurement laser beam 18, and the signal analysis unit 14 is a conventional means for comparing the reference laser beam 16 and the measurement laser beam 18 as received at the signal analysis unit 14 to determine phase shift which occurs during relative changes in the length the paths of either of the two beams 16 and 18. It should be recognized that, although in actual practice, the laser beams 16 and 18 do, of course, have a cross sectional dimension, the inventive principle is here best illustrated by depicting the laser beams as one dimensional lines.

It should be noted that, in actual practice either the reference laser beam 16 or the measurement laser beam 18 may be used as a measurement beam, depending upon the nature of the measurement to be made and other circumstantial conditions. Although the laser beams 16 and 18 may be interchanged in the actual practice of the best presently known embodiment 10 of the invention, the arrangement discussed herein is illustrative of the inventive principles.

A plane mirror 20 is the movable object the relative speed and distance of which, in a measurement plane 22, are to be determined. The plane mirror 20 may be mounted on a movable stage (not shown) or a movable portion of a machine to be controlled by means of feedback from the high resolution interferometer 10.

Additional components of the best presently known embodiment 10 of the inventive high resolution interferometer are a polarizing cube 24 having a polarizing surface 26 situated diagonally within, a cube corner retroreflector 28, a right angle reflector 30, a first quarter wave plate 32 and a second quarter wave plate 34.

As can be seen in the drawing, a first reference segment 16a of the reference beam 16 is directed to the polarizing surface 26, where it is reflected toward the cube corner 28. This occurs because the first reference segment 16a is linearly polarized as it leaves the laser head 12 such that it will not pass through the polarizing surface 26 and will be reflected therefrom. Thus, reflection from the polarizing surface directs a second reference segment 16b toward the cube corner 28. A third reference segment 16c is that portion of the reference beam 16 which is directed across the interior of the cube corner 28. It should be noted that the cube corner 28 is a well known and widely practiced component, and the intricacies of a path of reflection taken by a laser beam within the cube corner 28 is entirely within the knowledge of one skilled in the art and will not be discussed in detail herein.

A fourth reference segment 16d is that portion of the reference laser beam 16 Which is reflected back from the cube corner 28 to the polarizing surface 26. Since the reference laser beam 16 is not changed in polarization within the high resolution interferometer, it is again reflected from the polarizing surface 26. A fifth reference segment 16e is that portion of the reference laser beam 16 which is reflected from the polarizing surface 26 and directed into the signal analysis unit 14.

The path taken by the reference laser beam 16 is not unlike the path of a reference beam in a conventional plane mirror interferometer. However, the path taken by the measurement laser beam 18 and the combination of apparatus for directing it along that path, as described herein, are unique to the present invention. As can be seen in the drawing, a first measurement beam segment 18a is that portion of the measurement laser beam 18 emitted from the laser head 12. The first measurement beam segment 18a is linearly polarized in a plane orthogonal to that of the first reference segment 16a such that the first measurement beam segment 18a will pass through the polarizing surface 26 rather than being reflected therefrom. The first measurement beam segment 18a, after passing through the polarizing surface 26 continues through the second quarter wave plate 34 to the plane mirror 20, where it is reflected back as a second measurement beam segment 18b. The quarter wave plates 32 and 34 are well known components in the field. The effect of the passing any linearly polarized laser beam twice through the quarter wave plates (once in each direction, in this case) is to rotate the plane of polarization of the beam by ninety degrees. Thus, the effect of passing the first measurement beam segment 18a and the second measurement beam segment 18b through the second quarter wave plate 34 is to rotate the measurement laser beam 18 such that the second measurement beam segment 18b will not pass through the polarizing surface 26 and is reflected therefrom. It should be noted that, for illustrative purposes, the second measurement beam segment 18b is shown slightly displaced from the first measurement beam segment 18a in the plane of the paper in the drawing of FIG. 1, as are all laser beams which may be reflected straight back, herein.

A third measurement beam segment 18c is that portion of the measurement laser beam 18 which is reflected from the polarizing surface 26 onto the right angle reflector 30. The right angle reflector 30 is a simple reflector which directs the third measurement beam segment 18c through the first quarter wave plate 32 and toward the plane mirror 20 as a fourth measurement beam segment 18d. The fourth measurement beam segment 18d is reflected back from the plane mirror and again through the first quarter wave plate 32 as a fifth measurement beam segment 18e. The fifth measurement beam segment 18e, upon again encountering the right angle reflector 30 is again directed into the polarizing cube 24 toward the polarizing surface 26 as a sixth measurement beam segment 18f. The sixth measurement beam segment 18f is rotated ninety degrees in its plane of polarization as compared to the third measurement beam segment 18c, and thus the sixth measurement beam segment 18f can and does pass through the polarizing surface 26 toward the cube corner 28. Within the cube corner 28 the measurement laser beam 18 is directed across the cube corner 28 as a seventh measurement beam segment 18g, and is retroreflected from the cube corner 28 as an eighth measurement beam segment 18h.

Since the polarization of the eighth measurement beam segment 18h is unchanged as compared to the sixth measurement beam segment 18f, the eighth measurement beam segment can and does pass through the polarizing surface 26 to the right angle reflector 30, from which it is reflected through the first quarter wave plate 32 and toward the plane mirror as a ninth measurement section 18i. The ninth measurement beam segment 18i is reflected back from the plane mirror and again through the first quarter wave plate 32 as a tenth measurement beam segment 18j. The tenth measurement beam segment 18j, upon again encountering the right angle reflector 30 is again directed into the polarizing cube 24 toward the polarizing surface 26 as an eleventh measurement beam segment 18k. The eleventh measurement beam segment 18k is rotated ninety degrees in its plane of polarization as compared to the eighth measurement beam segment 18h, and thus the eleventh measurement beam segment 18k cannot pass through the polarizing surface 26 and is reflected therefrom through the second quarter wave plate toward the plane mirror 20 as a twelfth measurement beam segment 18l. Finally, the twelfth measurement beam segment 18l is reflected back from the plane mirror as a thirteenth measurement beam segment 18m, again through the second quarter wave plate 34. The thirteenth measurement beam segment 18m is rotated ninety degrees in its plane of polarization as compared to the twelfth measurement beam segment 18l, and thus the thirteenth measurement beam segment 18f can and does pass through the polarizing surface 26 and into the signal analysis unit 14.

As previously discussed, the signal analysis unit 14 receives and compares the reference laser beam 16 and the measurement laser beam 18 to determine the speed of the moving plane mirror 20 in the measurement plane 22 and, by integrating over a time period, the displacement of the plane mirror 20 and any apparatus to which it is fixed. Of course, the block representation of the signal analysis unit 14 in the drawing is merely representative of the actual physical device which, in actual practice, consists of a receiving portion (not shown) and a separate electronic signal analysis portion (not shown). The signal analysis unit 14 is not unique to the present invention with the exception that data therefrom is interpreted to represent only one half of the actual physical displacement of the plane mirror 20 as compared to readings obtained when the signal analysis unit 14 is used with a conventional prior art (double pass) plane mirror laser interferometer. The four passes of the measurement laser beam 18 in the best presently known embodiment 10 of the invention means that the measurement laser beam 18 is Doppler shifted four times to give a resolution of one-sixteenth of a wavelength.

While the drawing of FIG. 1 depicts the polarizing cube 24, the cube corner retroreflector 28 and the right angle reflector 30 as three separate units, in the actual physical embodiment of the best presently known embodiment 10 of the invention, these are joined into a single unit, thus increasing the reliability of the inventive high resolution plane mirror interferometer and also decreasing any potential for misalignment due to wear, temperature variation, or shock.

As is shown above, in great part, the high resolution laser interferometer 10 according to the present invention closely resembles prior art conventional plane mirror interferometers in many respects. The substantial difference exists in the inclusion of the unique inventive arrangement of reflectors and quarter wave plates to enable the multiplication of passes of the measurement laser beam without adding undue complication or expense of manufacture to the device. No significant changes of materials are envisioned nor are any special constructions required.

Various modifications may be made to the invention without altering its value or scope. For example, the inventive high resolution plane mirror interferometer could be practiced using laser heads other than the Helium Neon laser head described herein, and with either a dual or single frequency laser.

Another conceivable change is that the arrangement the inventive arrangement, or altered to cause the laser beams to be reflected in three dimensions. Similarly, since the inventive principle is independent of the path of the reference laser beam 16, alternative means for routing the reference laser beam 16 from the laser head 12 to the signal analysis unit 14 could be employed. Since the inventive arrangement of optical components is also independent of the type of signal reception and analysis devices and circuitry used, the present invention could be practiced with any existing or future type of laser transmission, reception, or analysis devices.

Furthermore, incidental changes such as the combining of the two quarter wave plates 32 and 32 into a single unit would be entirely within the scope of the invention.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The laser interferometer is widely used in the field of metrology. The predominant current usages are for the measurement of very small distances, particularly in the production of microcircuit devices and in the field of scientific investigation.

The improved laser interferometers of the present invention may be utilized in any application wherein conventional laser interferometers are used. The main area of improvement is in the increased resolution due to the multiplication of measurement laser beam passes.

The improved laser interferometers of the present invention are used in conjunction with any available laser head devices and signal processing devices in use with conventional laser interferometers. It is anticipated that the increased resolution provided by the inventive arrangement of interferometer optics will be readily accepted both in the field of metrology and in the manufacturing sector, particularly in the control of wafer stepper apparatus in the microchip manufacturing industry. In that application, the plane mirror 20 is mounted to a movable stage portion of a wafer stepper apparatus, and the signal analysis unit 14 is electrically connected to controlling circuitry of the wafer stepper apparatus. This arrangement is conventional in the field, and is not altered by application of the present invention.

Since the improved laser interferometers of the present 1 invention may be readily constructed and are physically significantly similar to prior art conventional laser interferometers it is expected that they will be acceptable in the industry as substitutes for the conventional plane mirror laser interferometer devices. For these and other reasons, it is expected that the utility and industrial applicability of the invention will be both significant in scope and long-lasting in duration.

I claim:

1. An improved interferometer, comprising:
   a columnated electromagnetic beam producing means for producing a measurement beam and a reference beam;
   a signal analysis apparatus for comparing the measurement beam to the reference beam;
   a reference beam redirecting means for directing the reference beam from the beam producing means to the signal analysis apparatus; and
   a measurement beam redirecting means for causing the measurement beam to be directed four times toward an objective mirror and then into the signal analysis apparatus such that the measurement beam is Doppler shifted in frequency four times by a movement of said objective mirror, wherein;
   the measurement beam redirecting means includes an optical component and a beam polarity rotating means, said optical component comprising a polarizing cube with a polarizing surface therein, a right angle reflector, and a cube corner retroreflector, said beam polarity rotating means being located between said optical component and said objective mirror such that polarity of the measurement beam is rotated by ninety degrees during each completed circuit of the measurement beam between said optical component and said objective mirror, and wherein;
   said optical component is configured such that the measurement beam is directed from the beam producing means, through said polarizing cube, through said beam polarity rotating means, to said objective mirror, through said beam polarity rotating means, to said polarizing surface, into the right angle reflector, through said beam polarity rotating means, to said objective mirror, through said beam polarity rotating means, into the right angle reflector, through said polarizing cube, into the cube corner retroreflector, through said polarizing cube, into the right angle reflector, through said beam polarity rotating means, to said objective mirror, through said beam polarity rotating means, into the right angle reflector, to said polarizing surface, through aid beam polarity rotating means; to said objective mirror, through said beam polarity rotating means, through said polarizing cube, and into the signal analysis apparatus.

2. In an interferometer having a coherent light source for producing a first light beam and a second light beam, an objective mirror for providing a reflective surface, the motion of which is to be measured by the interferometer, and an interference fringe analysis portion for determining motion of said objective mirror based upon a comparison of the first light beam and the second light beam, the improvement comprising:
   an optical component for directing the first light beam from the coherent light source into the interference fringe analysis portion and for directing the second light beam from the coherent light source such that it is reflected four times from said objective mirror and then is directed into the interference fringe analysis portion, said optical component including a polarizing cube, a right angle reflector, a cube corner retroreflector and one or more quarter wave plates, wherein;

said polarizing cube includes a polarizing surface; and said polarizing cube, the cube corner retroreflector, and the right angle reflector are arranged such that:

said polarizing cube is interposed in the path of the first light beam and the second light beam between the coherent light source and said objective mirror such that when either of the light beams is directed into said polarizing cube from the coherent light source and is reflected from said polarizing surface it is directed into the cube corner retroreflector, and further such that when either of the light beams is directed into said polarizing cube from said objective mirror and is reflected from said polarizing surface it is directed into the right angle reflector;

the right angle reflector is positioned such that when either of the light beams is directed thereinto from said polarizing cube it is redirected toward said objective mirror and when either of the light beams is directed thereinto from said objective mirror it is redirected toward said polarizing cube; and the cube corner retroreflector is positioned such that when either of the light beams is directed thereinto from said polarizing cube it is redirected back into said polarizing cube.

3. The improved interferometer of claim 2, wherein:
the quarter wave plates are positioned in the path of the second light beam between said objective mirror and said polarizing cube and further between said objective mirror and the right angle reflector.

4. A laser interferometer device for measuring relative motion of an objective mirror, including means for producing a polarized coherent measurement beam directed along a measurement beam path, and a respectively orthogonally polarized reference beam directed along a reference beam path, at least a terminal portion of said reference beam path being parallel to a terminal portion of said measurement beam path, wherein:

the measurement beam, as it traverses the measurement beam path, is modified and redirected by a series of optical components situated along the measurement beam path, with the interaction of said measurement beam and said optical components occurring in the following order:

a polarizing surface for either reflecting the measurement beam therefrom or allowing the measurement beam to pass therethrough, said polarizing surface being oriented so as to allow the measurement beam to pass therethrough when the measurement beam initially encounters said polarizing surface;

a first quarter wave plate for modifying polarity of the measurement beam;

the objective mirror, from which the measurement beam is reflected directly back;

said first quarter wave plate;

said polarizing surface from which, the measurement beam having been modified in polarity by said first quarter wave plate, the measurement beam is reflected;

a right angle reflector for redirecting the measurement beam;

a second quarter wave plate for modifying polarity of the measurement beam;

the objective mirror, from which the measurement beam is reflected directly back;

said second quarter wave plate;

said polarizing surface through which, the measurement beam having been modified in polarity by said second quarter wave plate, the measurement beam passes;

a cube corner retroreflector for redirecting the measurement beam back toward said polarizing surface;

said polarizing surface through which the measurement beam again passes;

said right angle reflector;

said second quarter wave plate;

said objective mirror;

said second quarter wave plate;

said polarizing surface from which, the measurement beam having been modified in polarity by said second quarter wave plate, the measurement beam is reflected;

said first quarter wave plate;

said objective mirror;

said first quarter wave plate;

said polarizing surface through which, the measurement beam having been modified in polarity by said first quarter wave plate, the measurement beam passes; and a fringe detection and analysis unit for combining the measurement beam and the reference beam and for obtaining data concerning changes in length of the measurement beam path.

5. The laser interferometer device of claim 4, wherein:
the reference beam, as it traverses the reference beam path, is redirected by a series of optical components situated along the reference beam path, with the interaction of said measurement beam and said optical components occurring in the following order:

said polarizing surface, said polarizing surface being oriented so as to cause the reference beam to be reflected therefrom;

said cube corner retroreflector, which redirects the reference beam back toward said polarizing surface;

said polarizing surface, from which the reference beam is again reflected; and said fringe detection and analysis unit.

6. The laser interferometer device of claim 4, wherein:
said objective mirror is a plane mirror.

7. The laser interferometer device of claim 4, wherein:
said fringe detection and analysis unit is adjusted to interpret results of comparison between the measurement beam and the reference beam to account for the fact that the measurement beam has been Doppler shifted four times prior to being compared therein to the reference laser beam.

8. The laser interferometer device of claim 4, wherein:
the first quarter wave plate and the second quarter wave plate cause polarization of the measurement beam to be rotated by ninety degrees upon being passed twice therethrough.

9. The laser interferometer device of claim 4, wherein:

said polarizing surface is contained within a polarizing cube; and said polarizing cube, said right angle reflector, said cube corner retroreflector, said first quarter wave plate and said second quarter wave plate are physically joined.

10. The laser interferometer device of claim 4, wherein:

motion of the objective mirror is in a measurement plane, said measurement plane being parallel to said terminal portion of the measurement beam and further being parallel to said terminal portion of the reference beam.

11. The laser interferometer device of claim 4, wherein:

the measurement beam and the reference beam are coherent light beams of a wavelength within the visible spectrum.

* * * * *